US012759548B2

(12) United States Patent
Krishnakumar et al.

(10) Patent No.: US 12,759,548 B2
(45) Date of Patent: Oct. 13, 2026

(54) METHODS AND APPARATUS TO DETERMINE A TARGET SPEED FOR AN AGRICULTURAL VEHICLE

(71) Applicant: Deere & Company, Moline, IL (US)

(72) Inventors: Shibinkumar Krishnakumar, Pune (IN); Girish Kumar Bellenavar, Pune (IN)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 18/934,827

(22) Filed: Nov. 1, 2024

(65) Prior Publication Data

US 2026/0125055 A1 May 7, 2026

(51) Int. Cl.
*B60W 30/14* (2006.01)
*G06F 16/29* (2019.01)

(52) U.S. Cl.
CPC ........... *B60W 30/143* (2013.01); *G06F 16/29* (2019.01); *B60W 2300/15* (2013.01); *B60W 2520/06* (2013.01); *B60W 2530/20* (2013.01)

(58) Field of Classification Search
CPC ........... B60W 30/143; B60W 2300/15; B60W 2520/06; B60W 2530/20; G06F 16/29
USPC ........................................................ 701/1, 50
See application file for complete search history.

(56) References Cited

U.S. PATENT DOCUMENTS 8,589,049 B2 11/2013 Craig
8,843,269 B2 9/2014 Anderson et al.
10,472,798 B2 11/2019 Sherlock
10,732,024 B2 8/2020 Sherlock
10,866,109 B2 * 12/2020 Madsen ............... G05D 1/0246
11,193,781 B2 * 12/2021 Madsen ................. B60K 35/22
11,314,213 B1 * 4/2022 Harweger ............ G05B 13/048
11,758,844 B2 * 9/2023 White .................. A01D 41/127 701/50
12,329,065 B2 * 6/2025 Vandike ............... G05D 1/0278
12,442,158 B1 * 10/2025 Sadilek ..................... E02F 9/26
2002/0069008 A1 6/2002 Nantz et al.
2006/0145828 A1 7/2006 Muller et al.
2018/0162462 A1 6/2018 Letscher et al.
2019/0124819 A1 5/2019 Madsen et al.
2019/0129435 A1 * 5/2019 Madsen ............... A01B 69/008
2020/0107490 A1 4/2020 Zemenchik
(Continued)

FOREIGN PATENT DOCUMENTS

EP 3812980 A1 4/2021

OTHER PUBLICATIONS

Extended European Search Report and Written Opinion issued in European Patent Application No. 25183216.8 dated Dec. 12, 2025, in 10 pages.

*Primary Examiner* — Jaime Figueroa
(74) *Attorney, Agent, or Firm* — Hanley, Flight & Zimmerman, LLC

(57) ABSTRACT

Methods and apparatus to determine a target speed for an agricultural vehicle are described. An apparatus described herein includes at least one processor circuit to obtain a terrain map corresponding to a field, obtain, from one or more sensors of a vehicle, orientation information and tire pressure information corresponding to the vehicle, execute a predictive model based on (a) the terrain map, (b) the orientation information, and (c) the tire pressure information, and determine, based on a result of the execution, a target speed for the vehicle on the field.

20 Claims, 10 Drawing Sheets

(56) References Cited

U.S. PATENT DOCUMENTS

| | | | | |
|---|---|---|---|---|
| 2021/0243936 | A1* | 8/2021 | Vandike | G05D 1/0278 |
| 2022/0110254 | A1* | 4/2022 | Vandike | B60W 50/0097 |
| 2023/0094319 | A1* | 3/2023 | Hansen | A01D 41/1277 701/50 |
| 2023/0107444 | A1* | 4/2023 | Anderson | A01D 41/127 382/110 |
| 2023/0334853 | A1* | 10/2023 | Vandike | G06V 20/188 |

* cited by examiner

METHODS AND APPARATUS TO DETERMINE A TARGET SPEED FOR AN AGRICULTURAL VEHICLE

FIELD OF THE DISCLOSURE

This disclosure relates generally to agricultural vehicles and, more particularly, to methods and apparatus to determine a target speed for an agricultural vehicle.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, Computer Vision (CV) with mono-cameras and/or stereo-cameras, etc.) to provide information to help navigate without assistance, or with limited assistance, from human users.

Figure 1:
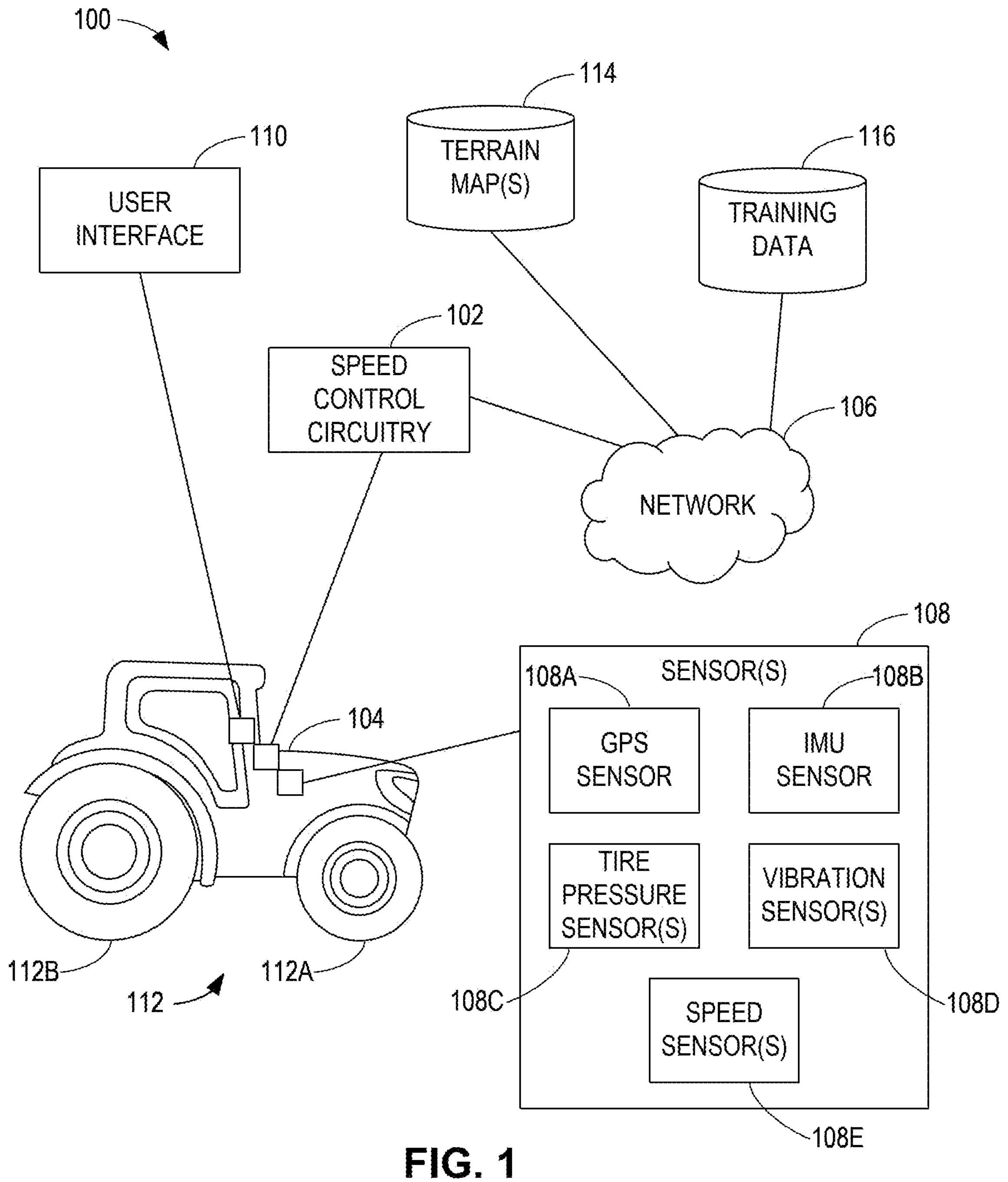
FIG. 1 illustrates an example environment in which example speed control circuitry can be implemented in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Agricultural vehicles are commonly used to perform one or more operations (e.g., harvesting, tilling, planting, spraying, etc.) on a field. In some instances, an operator of an agricultural vehicle manually steers the vehicle along one or more paths in the field to perform the operation(s). Further, the operator can control a speed (e.g., a travel speed) of the vehicle by, for instance, applying and/or adjusting a pressure to one or more control devices (e.g., a gas pedal and/or a brake pedal) of the vehicle.

In some instances, the vehicle may be automated, such that steering and/or control of the vehicle necessitates little or no human intervention. Automation of agricultural vehicles is commercially desirable because automation can improve the accuracy with which operations are performed, reduce operator fatigue, improve efficiency, and accrue other benefits. Some automated vehicles include and/or are otherwise enabled for automation functionality, but the operator may need to engage and/or disengage the automation functionality. For example, an operator could switch a vehicle into an autonomous mode of operation, but the vehicle would not autonomously drive until the operator presses a button or toggles a switch to “engage” automation. As such, the vehicle can be referred to as being in a “standby” autonomous mode of operation when automation is enabled but not engaged and in a “fully” autonomous mode of operation when automation is enabled and engaged. In either standby autonomous mode or fully autonomous mode, an operator may be present within the vehicle.

As used herein, a “target speed” refers to a vehicle speed at which a vehicle is expected to reduce (e.g., minimize) adverse effects to the vehicle and/or to an operator thereof and/or the field operation being performed. For instance, such adverse effects may include damage to the vehicle, reduced comfort for the operator, insufficient coverage of the field by one or more operations, etc. In some instances, the target speed of the vehicle along one or more paths in a field is based on the operation(s) to be performed and/or based on terrain characteristic(s) of the field. For instance, when the field includes rugged and/or uneven terrain, the target speed may be reduced to ensure adequate coverage of the field by the operation(s) while reducing damage to the vehicle and/or providing a relatively smooth ride for the operator. Additionally, in some instances, the target speed may be increased when the vehicle is travelling along an uphill portion of the field compared to when the vehicle is travelling along a downhill portion of the field.

In some instances, when uneven and/or changing terrain necessitates frequent adjustment of the vehicle speed, operation of the vehicle for long durations (e.g., hours) may result in operator fatigue. Further, selection of the target speed may be difficult when visibility is poor and/or when the terrain (e.g., in a projected path of the vehicle) is otherwise unknown. In some such instances, the operator may inadvertently drive the vehicle at a speed different from the target speed, resulting in an adverse ride experience (e.g., an oscillatory and/or uncomfortable ride experience) for the operator.

Examples described herein generate, train, and/or utilize one or more predictive models (e.g., speed prediction model(s), target speed prediction model(s)) to automatically (e.g., without human intervention) estimate a target speed for a vehicle. For example, to determine the target speed, example speed control circuitry described herein accesses example sensor data from one or more sensors of the vehicle. The sensor data can be used to determine orientation information (e.g., yaw, pitch, and/or roll of the vehicle 104) and/or tire pressure information (e.g., corresponding to respective wheel(s) of the vehicle). Further, the speed control circuitry can access one or more terrain maps associated with a field on which the vehicle is to travel and/or perform an operation. In some examples, the terrain map(s) include altitude information (e.g., altitude level(s)) corresponding to respective different locations and/or regions of the field. Additionally or alternatively, the terrain map(s) can include slope(s) of the field at the respective location(s), locations of crops and/or obstacles in the field, soil type(s), moisture level(s), etc. The terrain map(s) can be generated based on data captured during prior operation(s) on the field (e.g., by the vehicle and/or by other vehicle(s)).

In some examples, based on the orientation information, the terrain map(s), and/or the tire pressure information, the speed control circuitry executes the predictive model(s) to output the target speed(s) that are expected to result in a relatively smooth and/or comfortable ride for the operator. Further, the speed control circuitry can be operatively coupled to a propulsion system of the vehicle to automatically drive the vehicle at the target speed(s), thus reducing operator fatigue and/or reducing likelihood of an operator manually driving the vehicle at a speed different from the target speed(s). As a result, examples described herein can improve efficiency of performing an operation on the field and/or can reduce damage to the vehicle and/or to the field (e.g., damage that may result from excessive travel speeds of the vehicle).

FIG. 1 illustrates an example environment 100 in which example speed control circuitry 102 can be implemented in accordance with teachings of this disclosure. In the illustrated example of FIG. 1, the speed control circuitry 102 is implemented by an example vehicle (e.g., an agricultural vehicle) 104. In this example, the vehicle 104 is a tractor. In some examples, the vehicle 104 can be a different type of agricultural vehicle (e.g., a harvester, a front loader, a cultivator, or any other suitable vehicle). Further, while the speed control circuitry 102 is implemented by the vehicle 104 in this example, the speed control circuitry 102 can be implemented at a remote device communicatively coupled to the vehicle 104 (e.g., via an example network 106), at a cloud-based environment, etc.

In the example of FIG. 1, the vehicle 104 includes one or more example sensors (e.g., vehicle sensors) 108 and an example user interface 110. In this example, the sensor(s) 108 can include a Global Positioning System (GPS) sensor 108A, an Inertial Measurement Unit (IMU) sensor 108B, and/or one or more tire pressure sensors 108C. In some examples, the tire pressure sensor(s) 108C can be operatively coupled to respective wheels 112 of the vehicle 104 to measure and/or obtain example tire pressure information associated with the respective wheels 112. While two of the wheels 112 are shown in FIG. 1, the vehicle 104 can include a different number (e.g., two, three, four or more) of the wheels 112 and the associated tire pressure sensors 108C in some examples. In this example, the IMU sensor 108B includes one or more accelerometers, one or more gyroscopes, and/or one or more magnetometers to measure an orientation of the vehicle 104 (e.g., with respect to the ground). The IMU sensor 108B can output example orientation information including at least one of a pitch angle, a roll angle, a yaw angle, a pitch angle rate, a roll angle rate, or a yaw angle rate of the vehicle 104 (e.g., relative to a starting orientation of the vehicle 104). While the IMU sensor 108B is used in this example, one or more different types of sensors (e.g., LiDAR sensor(s), radar sensor(s), camera(s), etc.) may additionally or alternatively be used to measure and/or determine the orientation information. In some examples, the sensor(s) 108 can include one or more example vibration sensors 108D operatively coupled to and/or mounted on the vehicle 104 to measure vibration information associated with the vehicle 104. For example, the vibration information can include vibration levels (e.g., frequency and/or amplitude of oscillations) of the vehicle 104 measured at respective different locations in a field. In some examples, the sensor(s) 108 can include one or more example speed sensors 108E operatively coupled to and/or mounted on the vehicle 104 to measure speed information (e.g., travel speed(s)) associated the vehicle 104. For example, the speed information can include speed(s) (e.g., travel speed(s)) of the vehicle 104 at respective location(s) and/or along respective path(s) in the field.

In the illustrated example of FIG. 1, the user interface 110 is implemented on the vehicle 104 and corresponds to a Human Machine Interface (HMI) of the vehicle 104. In some examples, the user interface 110 can present information (e.g., the orientation information, the tire pressure information, GPS data, a target speed, the vibration information, the speed information, etc.) to an operator of the vehicle 104, and/or can enable user input from the operator. In the illustrated example of FIG. 1, the speed control circuitry 102 is operatively and/or communicatively coupled to the sensor(s) 108 to obtain example sensor data (e.g., the orientation information, the tire pressure information, the vibration information, the speed information, etc.) therefrom. Further, the speed control circuitry 102 is operatively and/or communicatively coupled to the user interface 110 to obtain user input therefrom and/or to cause presentation of information (e.g., a determined target speed) on the user interface 110.

Further, in the example of FIG. 1, the speed control circuitry 102 can access (e.g., via the network 106) one or more example terrain maps 114 and/or example training data 116 for use in generating and/or executing one or more example speed prediction models (e.g., speed prediction neural network model(s)). In some examples, the terrain map(s) 114 can be accessed from a cloud-based storage environment and/or a remote device via the network 106, and/or can be preloaded in the speed control circuitry 102. In some examples, the terrain map(s) 114 correspond to one or more respective fields (and/or portion(s) thereof) on which the vehicle 104 is to perform one or more operations (e.g., harvesting, tilling, planting, etc.). The terrain map(s) 114 can be generated based on historical sensor data (e.g., historical GPS data and/or historical orientation information) captured by the vehicle 104 and/or by one or more different vehicles during one or more previous (e.g., prior) operations on the field(s). For example, the terrain map(s) 114 can include altitude information corresponding to respective locations (e.g., latitude-longitude coordinates) in the field(s). In some examples, the terrain map(s) 114 can include historical orientation information captured at the respective locations, location(s) of obstacles (e.g., protrusions, recesses, trenches, etc.) in the field, slope(s) of the field at respective location(s), soil type(s), moisture level(s), etc.

In the illustrated example of FIG. 1, the speed control circuitry 102 generates, trains, and/or executes the speed prediction model(s) to determine target speed(s) for the vehicle 104 at one or more locations of a field and/or along one or more paths in the field. In some examples, the speed control circuitry 102 can generate and/or train the speed prediction model(s) based on the training data 116. Further, the speed control circuitry 102 can execute the trained speed prediction model(s) based on sensor data obtained from the sensor(s) 108 (e.g., during and/or after operation of the vehicle 104 on the field). As a result of the execution, the speed control circuitry 102 determines the target speed(s) for the vehicle 104. In some examples, the speed control circuitry 102 outputs (e.g., via the user interface 110) the target speed(s) for presentation to an operator. In some such examples, the operator can manually adjust a current speed of the vehicle 104 (e.g., by engaging a brake pedal and/or a gas pedal of the vehicle 104) to cause the vehicle 104 to travel at or near (e.g., within 10 percent (%) of) the target speed(s). In some examples, the speed control circuitry 102 can automatically adjust and/or control the current speed of the vehicle 104. For example, the speed control circuitry 102 can be operatively coupled to a propulsion system of the vehicle 104 to cause the vehicle 104 to travel at or near (e.g., within 10% of) the target speed(s). As a result, the speed control circuitry 102 can reduce operator fatigue, reduce likelihood of damage to the vehicle 104, and/or provide a comfortable and/or smooth ride experience for the operator.

In some examples, the speed prediction model(s) generated and/or executed by the speed control circuitry 102 are machine learning model(s) based on neural network(s). Artificial intelligence (AI), including machine learning (ML), deep learning (DL), reinforcement learning (RL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations. In some examples, a machine learning framework based on TensorFlow and/or PyTorch may be used for training one or more models disclosed herein.

Many different types of machine learning models and/or machine learning architectures exist. In examples described herein, neural networks are used. However, other types of machine learning models could additionally or alternatively be used. In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples described herein, ML/AI models are trained using stochastic gradient descent. However, any other training algorithm may additionally or alternatively be used. In examples described herein, training is performed until one or more performance thresholds are satisfied (e.g., when a difference between predicted target speed(s) output by the model(s) and corresponding ground truth target speed(s) from the training data 116 satisfies the performance threshold(s)). In examples described herein, training is performed locally (e.g., at the vehicle 104). In some examples, training can be performed remotely (e.g., at a separate device and/or in a cloud-based environment). Training is performed using hyperparameters that control how the learning is performed (e.g., a learning rate, a number of layers to be used in the machine learning model, etc.). In some examples re-training and/or tuning may be performed. Such re-training and/or tuning may be performed periodically (e.g., during operation and/or travel by the vehicle) and/or in response to operator-selected speed setting(s) varying (e.g., by at least a threshold amount) from the target speed(s) output by the model(s).

Training is performed using the training data 116. In examples described herein, the training data 116 originates from historical data (e.g., sensor data) captured during prior operation(s) on a field, and/or originates from simulation data generated based on computer simulation(s) of the vehicle 104. Because supervised training is used, the training data 116 is labeled. For example, the training data 116 can be labelled with ground truth target speed(s) (e.g., speeds which the operator(s) manually selected for the vehicle 104) and/or with indication(s) of whether the target speed(s) resulted in a satisfactory (e.g., relatively smooth and/or comfortable) ride experience. Labeling can be applied to the training data 116 manually (e.g., by an operator) and/or automatically (e.g., by the speed control circuitry 102 based on vibration level(s) and/or speed(s) of the vehicle 104 detected at one or more locations). In some examples, the training data 116 is pre-processed to, for example, remove duplicates, interpolate between data values, etc. In some examples, the training data 116 is subdivided into a training dataset and a validation dataset.

Once training is complete, the model is deployed for use as an executable construct that processes an input and provides an output based on the network of nodes and connections defined in the model. The model is stored locally (e.g., at the vehicle 104) or remotely (e.g., at a cloud-based environment, at a remote device communicatively coupled to the vehicle 104, etc.). The model may then be executed by the speed control circuitry 102.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training (e.g., tuning) of an updated model can be triggered using the feedback and an updated training data set, hyperparameters, etc., to generate an updated, deployed model. Generation and/or training of the speed prediction model(s) is described further below in connection with FIG. 2.

Figure 2:
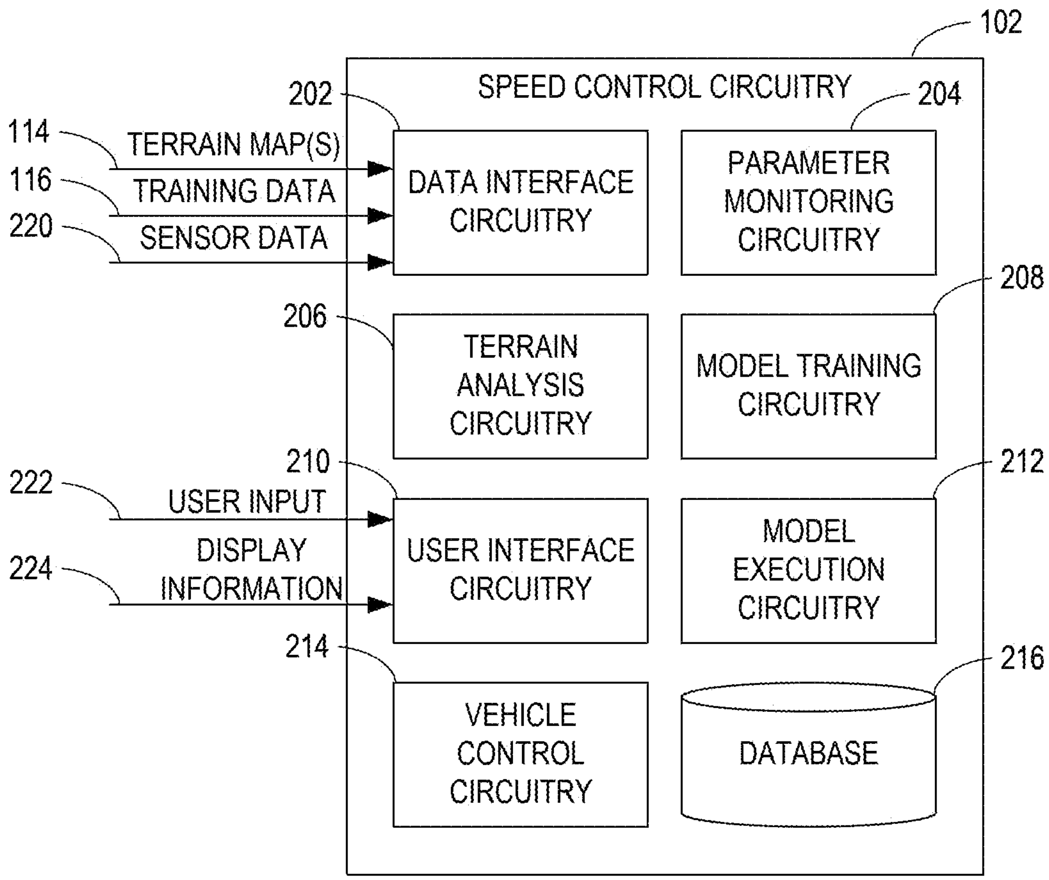
FIG. 2 is a block diagram of an example implementation of the speed control circuitry of FIG. 1.

FIG. 2 is a block diagram of an example implementation of the example speed control circuitry 102 of FIG. 1. The speed control circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the speed control circuitry 102 of FIG. 2 may be instantiated (e.g., creating an instance of, bring into being for any length of time, materialize, implement, etc.) by (i) a graphics processing unit (GPU), (ii) an Application Specific Integrated Circuit (ASIC), and/or (iii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the speed control circuitry 102 includes example data interface circuitry 202, example parameter monitoring circuitry 204, example terrain analysis circuitry 206, example model training circuitry 208, example user interface circuitry 210, example model execution circuitry 212, example vehicle control circuitry 214, and an example database 216.

The data interface circuitry 202 of FIG. 2 accesses, retrieves, and/or otherwise obtains data to be utilized by the speed control circuitry 102 for generating, training, and/or executing the speed prediction model(s). In the illustrated example of FIG. 2, the speed control circuitry 102 obtains the terrain map(s) 114 and/or the training data 116 of FIG. 1 (e.g., via the network 106 of FIG. 1). In some examples, the terrain map(s) 114 and/or the training data 116 can be preloaded in the speed control circuitry 102 (e.g., in the database 216). Further, in the example of FIG. 2, the data interface circuitry 202 is communicatively coupled to the sensor(s) 108 of FIG. 1 to access and/or obtain example sensor data 220 therefrom. Additionally or alternatively, the sensor data 220 can include image data from one or more cameras implemented on the vehicle 104, and/or data from one or more different sensors (e.g., LiDAR sensor(s), radar sensor(s), etc.) implemented on the vehicle 104. In some examples, the data interface circuitry 202 can access the sensor data 220 periodically and/or in substantially real time during operation and/or travel of the vehicle 103 on a field. In some examples, the data interface circuitry 202 provides the terrain map(s) 114, the training data 116, and/or the sensor data 220 to the database 216 for storage therein. In some examples, the data interface circuitry 202 is instantiated by programmable circuitry executing data interface circuitry instructions and/or configured to perform operations such as those represented by the flowchart(s) of FIG. 5.

The database 216 stores data utilized and/or obtained by the speed control circuitry 102. The example database 216 of FIG. 2 is implemented by any memory, storage device and/or storage disc for storing data such as, for example, flash memory, magnetic media, optical media, solid state memory, hard drive(s), thumb drive(s), etc. Furthermore, the data stored in the database 216 may be in any data format such as, for example, binary data, comma delimited data, tab delimited data, structured query language (SQL) structures, etc. While, in the illustrated example, the database 216 is illustrated as a single device, the database 216 and/or any other data storage devices described herein may be implemented by any number and/or type(s) of memories.

The parameter monitoring circuitry 204 of FIG. 2 determines, monitors, and/or obtains, based on the sensor data 220, one or more example parameters associated with the vehicle 104. For example, the parameter monitoring circuitry 204 monitors orientation information, tire pressure information, vibration information, and/or speed information associated with the vehicle 104 at corresponding locations (e.g., latitude-longitude coordinates) in a field. In some examples, to determine the orientation information (e.g., a current orientation) of the vehicle 104 at a given location (e.g., current latitude-longitude coordinates), the parameter monitoring circuitry 204 accesses a first portion of the sensor data 220 from the IMU sensor 108B. Based on the first portion of the sensor data 220, the parameter monitoring circuitry 204 determines the orientation information including a pitch angle, a roll angle, and/or a yaw angle of the vehicle 104 (e.g., with respect to the ground and/or with respect to a starting orientation of the vehicle 104). Additionally or alternatively, the parameter monitoring circuitry 204 determines a pitch angle rate, a roll angle rate, and/or a yaw angle rate of the vehicle 104 based on the first portion of the sensor data 220. In some examples, the parameter monitoring circuitry 204 determines the location of the vehicle 104 based on a second portion of the sensor data 220 (e.g., from the GPS sensor 108A), and associates the orientation information with the corresponding location. In some examples, the parameter monitoring circuitry 204 provides the orientation information to the database 216 for storage therein (e.g., in association with the corresponding location).

In some examples, the parameter monitoring circuitry 204 of FIG. 2 determines, monitors, and/or obtains the tire pressure information associated with the vehicle 104. For example, the parameter monitoring circuitry 204 accesses a third portion of the sensor data 220 from the tire pressure sensors 108C of the vehicle 104. Based on the third portion of the sensor data 220, the parameter monitoring circuitry 204 determines the tire pressure information representative of tire pressure(s) (e.g., current tire pressure(s)) at respective one(s) of the wheels 112 of the vehicle 104. In some examples, the parameter monitoring circuitry 204 associates the tire pressure information with the corresponding location of the vehicle 104 (e.g., based on the second portion of the sensor data 220 from the GPS sensor 108A). In some examples, the parameter monitoring circuitry 204 provides the tire pressure information to the database 216 for storage therein (e.g., in association with the corresponding location).

In some examples, the parameter monitoring circuitry 204 of FIG. 2 determines, monitors, and/or obtains the vibration information and/or the speed information associated with the vehicle 104. For example, the parameter monitoring circuitry 204 accesses a fourth portion of the sensor data 220 from the vibration sensor(s) 108D of the vehicle 104. Based on the fourth portion of the sensor data 220, the parameter monitoring circuitry 204 determines the vibration information including vibration level(s) corresponding to one or more components of the vehicle 104. In some examples, the parameter monitoring circuitry 204 accesses a fifth portion of the sensor data 220 from the speed sensor(s) 108E of FIG. 1. Based on the fifth portion of the sensor data 220, the parameter monitoring circuitry 204 determines the speed information including a current speed (e.g., an actual speed, a measured speed) of the vehicle 104. In some examples, the parameter monitoring circuitry 204 associates the vibration information and/or the speed information with corresponding location(s) of the vehicle 104 (e.g., based on the second portion of the sensor data 220 from the GPS sensor 108A). In some examples, the parameter monitoring circuitry 204 provides the vibration information and/or the speed information to the database 216 for storage therein (e.g., in association with the corresponding location(s)). In some examples, the parameter monitoring circuitry 204 is instantiated by programmable circuitry executing parameter monitoring circuitry instructions and/or configured to perform operations such as those represented by the flowchart(s) of FIG. 5.

In some examples, the terrain analysis circuitry 206 analyzes and/or monitors terrain of a field on which the vehicle 104 is travelling and/or operating. For example, the terrain analysis circuitry 206 can access the terrain map(s) 114 corresponding to the vehicle 104 to determine example terrain information corresponding to one or more locations (e.g., latitude-longitude coordinates) and/or regions in the field. For example, the terrain information can include as an altitude(s) at respective location(s) (e.g., latitude-longitude coordinates) in the field, and/or location(s) of crops, obstacles, protrusions, trenches, etc. in the field. In some examples, the terrain information can include soil type(s) and/or moisture level(s) at respective location(s) in the field.

In some examples, the terrain analysis circuitry 206 determines the terrain information associated with a current location of the vehicle 104 in the field (e.g., where the current location is based on the GPS data from the GPS sensor 108A). For example, the terrain analysis circuitry 206 can determine, based on the terrain map(s) 114, the terrain information corresponding to a region surrounding and/or proximate the current location. In some examples, the terrain analysis circuitry 206 can analyze and/or determine the terrain information along a projected path of the vehicle 104. In some examples, the terrain analysis circuitry 206 is instantiated by programmable circuitry executing terrain analysis circuitry instructions and/or configured to perform operations such as those represented by the flowchart(s) of FIG. 5.

The user interface circuitry 210 of FIG. 2 is operatively and/or communicatively coupled to the user interface 110 of FIG. 1. In some examples, the user interface circuitry 210 can obtain example user input 222 via the user interface 110, and/or can output example display information 224 via the user interface 110. In some examples, the user input 222 can include example speed settings (e.g., operator speed settings) selected by the operator of the vehicle 104. For example, the operator can select threshold speed(s) (e.g., maximum and/or minimum speeds) and/or a threshold speed range for the vehicle 104. In such examples, the threshold(s) (e.g., the threshold speed(s) and/or the threshold speed range) can be provided as input to the speed prediction model(s), such that the target speed(s) output by the speed prediction model(s) satisfy the corresponding threshold(s) (e.g., the target speed is greater than or equal to the minimum speed, the target speed is less than or equal to the maximum speed, the target speed is within the threshold speed range, etc.). In some examples, the user input 222 can further include operator feedback obtained from the operator (e.g., via the user interface 110) during and/or after an operation by the vehicle 104. In some such examples, the operator feedback can indicate whether the operator experienced a smooth and/or comfortable ride along one or more paths, regions, locations, etc. in the field. In some examples, the operator feedback can be used to re-train and/or tune the speed prediction model(s), and/or can trigger re-training and/or tuning of the speed prediction model(s).

In some examples, the display information 224 can include information determined and/or obtained by the speed control circuitry 102. For example, the display information 224 can include the terrain map(s) 114 (e.g., and/or a portion thereof), and/or can include the target speed(s) determined for the vehicle 104 (e.g., based on the speed prediction model(s)). In some examples, the user interface circuitry 210 can cause the user interface 110 to present the target speed(s) to the operator visually (e.g., via a display of the user interface 110) and/or audibly. In some examples, the user interface circuitry 210 is instantiated by programmable circuitry executing user interface circuitry instructions and/or configured to perform operations such as those represented by the flowchart(s) of FIG. 5.

The model training circuitry 208 generates, trains, and/or tunes one or more example speed prediction model(s) based on the training data 116. In some examples, the training data 116 includes historical data measured and/or obtained for one or more previous operations and/or trips completed by the vehicle 104 (and/or by one or more different vehicles). For example, the operations and/or trips represented in the training data 116 can be performed by multiple different vehicles and/or on multiple different fields. In some examples, for a corresponding operation and/or trip represented in the training data 116, the training data 116 can include historical speed(s) at which a vehicle travelled at one or more locations in a field, historical tire pressures of the vehicle at the respective location(s), historical orientations of the vehicle(s) at the respective location(s), historical vibration level(s) of the vehicle(s) at the respective location(s), and/or historical terrain information (e.g., altitude information) corresponding to the field at the respective location(s).

In some examples, the training data 116 can include labels corresponding to one(s) of the operations and/or trips represented in the training data 116. For example, the label(s) can represent feature(s) (e.g., the speed(s), the tire pressure(s), the orientation(s), the vibration level(s), the terrain information, etc.) measured and/or determined for the corresponding operation(s) and/or trip(s) represented in the training data 116. In some examples, the labels can include indications of whether a corresponding operation and/or trip resulted in a comfortable and/or smooth ride experience for the operator. For example, the indication can be based on operator input (e.g., obtained via user input during and/or after the operation(s)) indicating whether the historical speeds resulted in a comfortable and/or smooth ride experience for the operator. In some examples, the indication is based on the historical vibration level(s). For example, when the historical vibration level(s) along a path satisfy (e.g., are less than or equal to) an example vibration threshold, the labels include an indication that the speed(s) for a corresponding operation and/or trip resulted in a smooth ride experience. Conversely, when the historical vibration level(s) do not satisfy (e.g., are greater than) the vibration threshold, the labels include an indication that the speed(s) for a corresponding operation and/or trip did not result in a smooth ride experience.

In some examples, the model training circuitry 208 selects, from the training data 116, a first portion (e.g., 80%, 75%, etc.) of the training data 116 as a training dataset and a second portion (e.g., 20%, 25%, etc.) of the training data 116 as a validation dataset. In such examples, the model training circuitry 208 can train one or more neural networks based on the training dataset. For example, the model training circuitry 208 can identify patterns and/or correlations between feature(s) (e.g., the terrain information, the orientation(s), the tire pressure(s), etc.) and corresponding target speed(s) (e.g., the speed(s) that resulted in a smooth and/or comfortable ride experience) represented in the training dataset. In some examples, the model training circuitry 208 adjusts weight(s) of the neural network(s) based on the patterns and/or correlations, such that the neural network(s) output the speed(s) when the neural network(s) are executed based on the feature(s). In some examples, the model training circuitry 208 generates the speed prediction model(s) based on the trained neural network(s).

In some examples, the model training circuitry 208 validates the speed prediction model(s) based on the validation dataset. In some such examples, the model training circuitry 208 executes the speed prediction model(s) based on the feature(s) represented in the validation dataset. As a result of the execution, the model training circuitry 208 outputs predicted target speeds, and compares the predicted target speeds to corresponding target speeds (e.g., ground truth target speeds) included in the validation dataset. In some examples, the model training circuitry 208 calculates a difference (e.g., a percentage difference) between the predicted target speeds (e.g., output based on the speed prediction model(s)) and the ground truth target speeds (e.g., represented in the validation dataset). In some examples, the model training circuitry 208 determines whether the predicted target speeds satisfy example criteria (e.g., performance criteria) associated with the speed prediction model(s). For example, the model training circuitry 208 determines that the criteria are satisfied when the difference(s) between the predicted target speed(s) and the corresponding ground truth target speed(s) are less than or equal to a threshold difference (e.g., 10%, 5%, etc.). Conversely, the model training circuitry 208 determines that the criteria are not satisfied when the difference(s) between the predicted target speed(s) and the corresponding ground truth target speed(s) are greater than the threshold difference.

In some examples, when the model training circuitry 208 determines that the criteria are not satisfied, the model training circuitry 208 performs further training (and/or re-training) of the speed prediction model(s). Alternatively, when the model training circuitry 208 determines that the criteria are satisfied, the model training circuitry 208 stores (e.g., in the database 216) the speed prediction model(s) (e.g., the trained speed prediction model(s)) for execution by the model execution circuitry 212. In some examples, the model execution circuitry 212 can provide the trained speed prediction model(s) to one or more different vehicles, where the speed prediction model(s) can be utilized and/or tuned (e.g., fine-tuned) locally at the respective vehicle(s).

In some examples, the model training circuitry 208 can re-train and/or tune the speed prediction model(s) (e.g., periodically and/or responsive to input). For example, after generating and/or accessing the speed prediction model(s) trained based on the training data 116, the model training circuitry 208 can tune the speed prediction model(s) based on example tuning data recorded and/or obtained by the parameter monitoring circuitry 204. For example, the tuning data can include additional sensor input and/or feedback obtained from the sensor(s) 108 during an operation. In some examples, the parameter monitoring circuitry 204 obtains and/or records the tuning data when the operator overrides the target speed(s) selected for the vehicle 104. For example, the operator can override the target speed(s) by adjusting (e.g., manually selecting) the speed of the vehicle 104 based on user input to the user interface 110, by engaging a brake pedal and/or a gas pedal of the vehicle 104, etc. In some examples, when the operator overrides the target speed(s), the parameter monitoring circuitry 204 collects and/or obtains the tuning data including a current speed (e.g., a selected speed, an actual speed) of the vehicle 104 from the speed sensor(s) 108E, current tire pressure information from the tire pressure sensor(s) 108C, current orientation information from the IMU sensor 108B, and/or current terrain information (e.g., as determined by the terrain analysis circuitry 206). In some examples, the parameter monitoring circuitry 204 continuously or periodically collects the tuning data for a duration during which the operator manually operates (e.g., controls a speed of) the vehicle 104, and/or for a preset duration (e.g., 10 seconds, 15 seconds, etc.) after the speed has been manually adjusted. In some examples, the parameter monitoring circuitry 204 provides the tuning data to the database 216 for storage.

In some examples, the model training circuitry 208 triggers tuning of the speed prediction model(s) when a sufficient amount of tuning data has been obtained by the parameter monitoring circuitry 204 (e.g., when the amount of tuning data is satisfies an example tuning threshold). For example, the tuning data satisfies the tuning threshold when the target speed has been overridden at least a threshold number (e.g., five, ten, etc.) of times, and/or when a duration represented in the tuning data satisfies (e.g., is greater than or equal to) a threshold duration. In some examples, the model training circuitry 208 triggers tuning of the speed prediction model(s) based on vibration data (e.g., vibration information) associated with the vehicle 104 (e.g., during operation and/or travel on a field). For example, the model training circuitry 208 can trigger the tuning when vibration level(s) of the vehicle 104 do not satisfy (e.g., are greater than) an example vibration threshold (e.g., indicating that the target speed(s) determined for the vehicle 104 do not result in a smooth ride experience for the operator). In some examples, tuning of the speed prediction model(s) is triggered upon completion of a trip and/or operation by the vehicle 104, and/or is triggered periodically (e.g., at a particular frequency and/or distance travelled) during and/or after the trip and/or operation. In some examples, the tuning can be triggered manually (e.g., by user input to the user interface 110).

In some examples, the model training circuitry 208 tunes the speed prediction model(s) by accessing the tuning data captured during operation and/or travel of the vehicle 104, and identifying patterns and/or correlations between features (e.g., the orientation information, the terrain information, and/or the tire pressure information) represented in the tuning data with the corresponding speed(s) (e.g., actual speed(s) of the vehicle 104) selected by the operator. In some examples, the model training circuitry 208 can adjust (e.g., tune) one or more parameters (e.g., hyperparameter(s), weight(s), etc.) of the speed prediction model(s) based on the identified patterns and/or correlations. In some examples, the model training circuitry 208 is instantiated by programmable circuitry executing model training circuitry instructions and/or configured to perform operations such as those represented by the flowchart(s) of FIG. 6.

The model execution circuitry 212 executes the speed prediction model(s) (e.g., the trained speed prediction model(s)) to determine one or more target speeds for the vehicle 104. For example, the model execution circuitry 212 executes the speed prediction model(s) based on the terrain information, the orientation information, the tire pressure information, operator speed settings (e.g., a maximum speed selected by the operator) and/or the vibration information associated with the vehicle 104 at a respective location and/or region in the field. In some examples, based on a result of the execution, the model execution circuitry 212 outputs the target speed(s) for the vehicle 104. In such examples, the target speed(s) indicate a speed at which the vehicle 104 is to traverse the field (e.g., and/or a portion thereof) to provide a smooth and/or comfortable ride experience for the operator of the vehicle 104.

In some examples, the model execution circuitry 212 determines the target speed periodically and/or at multiple locations in the field. For example, the model execution circuitry 212 can determine and/or adjust the target speed at a particular frequency (e.g., every 5 seconds, every 10 seconds, etc.) and/or at particular distances (e.g., every 10 feet, every 20 feet, etc.). In some examples, the model execution circuitry 212 can store (e.g., in the database 216) the determined target speeds in association with the corresponding locations of the vehicle 104 to generate a target speed map for the field. For example, the target speed map can indicate the target speeds for respective locations, regions, and/or paths in the field, and the target speed map can be utilized by the vehicle 104 (and/or by one or more other vehicles) during a second (e.g., subsequent) operation on the field to determine target speed(s) for the second operation. In some examples, the model execution circuitry 212 is instantiated by programmable circuitry executing model execution circuitry instructions and/or configured to perform operations such as those represented by the flowchart(s) of FIG. 5.

The vehicle control circuitry 214 of FIG. 2 controls a speed (e.g., a current speed) of the vehicle 104 based on the determined target speed(s). For example, the vehicle control circuitry 214 is operatively coupled to a propulsion system of the vehicle 104, and the vehicle control circuitry 214 can adjust (e.g., increase and/or decrease), via the propulsion system, the speed of the vehicle 104 to match (e.g., be substantially equal to, be within ±10% of) the target speed determined for a corresponding location of the vehicle 104. In some examples, the operator can override (e.g., via the user input 222 to the user interface 110, by engaging a brake pedal and/or a gas pedal of the vehicle 104) the speed control by the vehicle control circuitry 214 to manually adjust the speed of the vehicle 104. In some examples, the vehicle control circuitry 214 is instantiated by programmable circuitry executing vehicle control circuitry instructions and/or configured to perform operations such as those represented by the flowchart(s) of FIG. 5.

Figure 3:
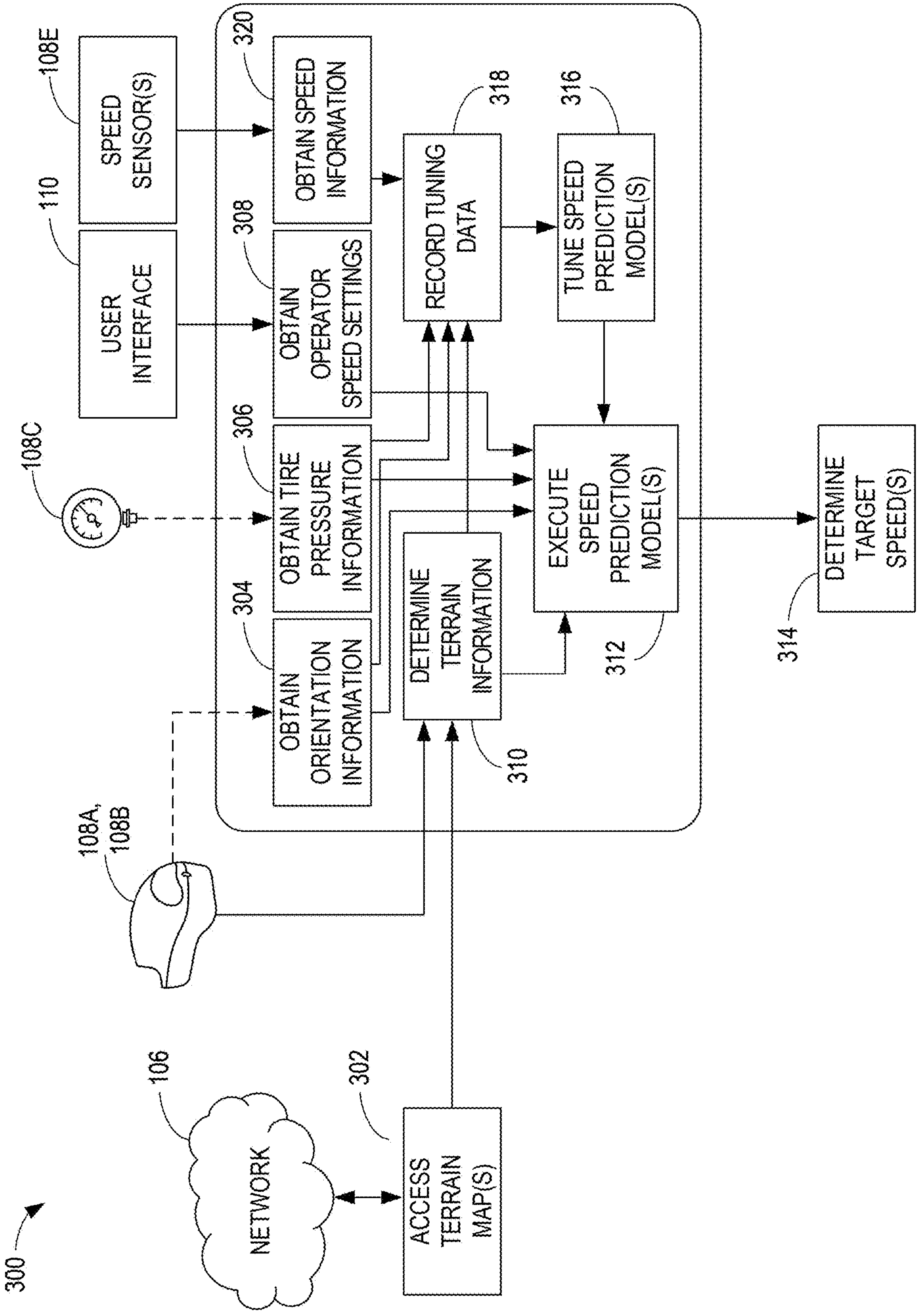
FIG. 3 is a flow diagram representative of an example target speed prediction process that may be implemented by the speed control circuitry of FIGS. 1 and/or 2.

FIG. 3 is a flow diagram representative of an example target speed prediction process 300 that may be implemented by the speed control circuitry 102 of FIGS. 1 and/or 2. In the illustrated example of FIG. 3, to perform the target speed prediction process 300, the speed control circuitry 102 accesses, via the network 106, the terrain map(s) 114 of FIG. 1 (block 302). Further, the speed control circuitry 102 obtains the orientation information (block 304) from the IMU sensor 108B, obtains the tire pressure information (block 306) from the tire pressure sensor(s) 108C, and obtains the operator speed settings (block 308) via user input from the user interface 110. In some examples, based on the terrain map(s) 114 and a current location of the vehicle 104 (e.g., from the GPS sensor 108A), the speed control circuitry 102 obtains the terrain information (block 310) corresponding to a region surrounding the vehicle 104 and/or in a projected path of the vehicle 104.

In the illustrated example of FIG. 3, the speed control circuitry 102 executes the speed prediction model(s) (block 312) based on the orientation information, the terrain information, the operator speed settings, and/or the tire pressure information. In some examples, the speed control circuitry 102 determines a target speed for the vehicle 104 (block 314) based on a result of the execution. Additionally, in some examples, the speed control circuitry 102 can tune the speed prediction model(s) (block 316) (e.g., prior to and/or subsequent to execution of the speed prediction model(s)). In some examples, to tune the speed prediction model(s), the speed control circuitry 102 records and/or collects example tuning data (block 318). For example, when an operator of the vehicle 104 manually adjusts and/or overrides the target speed(s) determined for the vehicle 104, the speed control circuitry 102 can collect the tuning data including the orientation information, the tire pressure information, and/or the terrain information. Further, the speed control circuitry 102 obtains speed information associated with the vehicle 104 (e.g., a current and/or actual speed of the vehicle 104) (block 320), and includes the speed information in the tuning data. In some examples, when a sufficient amount of tuning data has been recorded (e.g., the amount of the tuning data satisfies a tuning threshold), the speed control circuitry 102 tunes the speed prediction model(s) by identifying patterns and/or correlations between the orientation information, the tire pressure information, and/or the terrain information represented in the tuning data with the corresponding speed(s) represented in the tuning data. The speed control circuitry 102 then adjusts one or more parameters (e.g., weight(s), hyperparameter value(s)) of the speed prediction model(s) based on the identified patterns and/or correlations. In some examples, the speed control circuitry 102 can tune the speed prediction model(s) periodically and/or in response to input (e.g., user input provided via the user interface 110).

Figure 4:
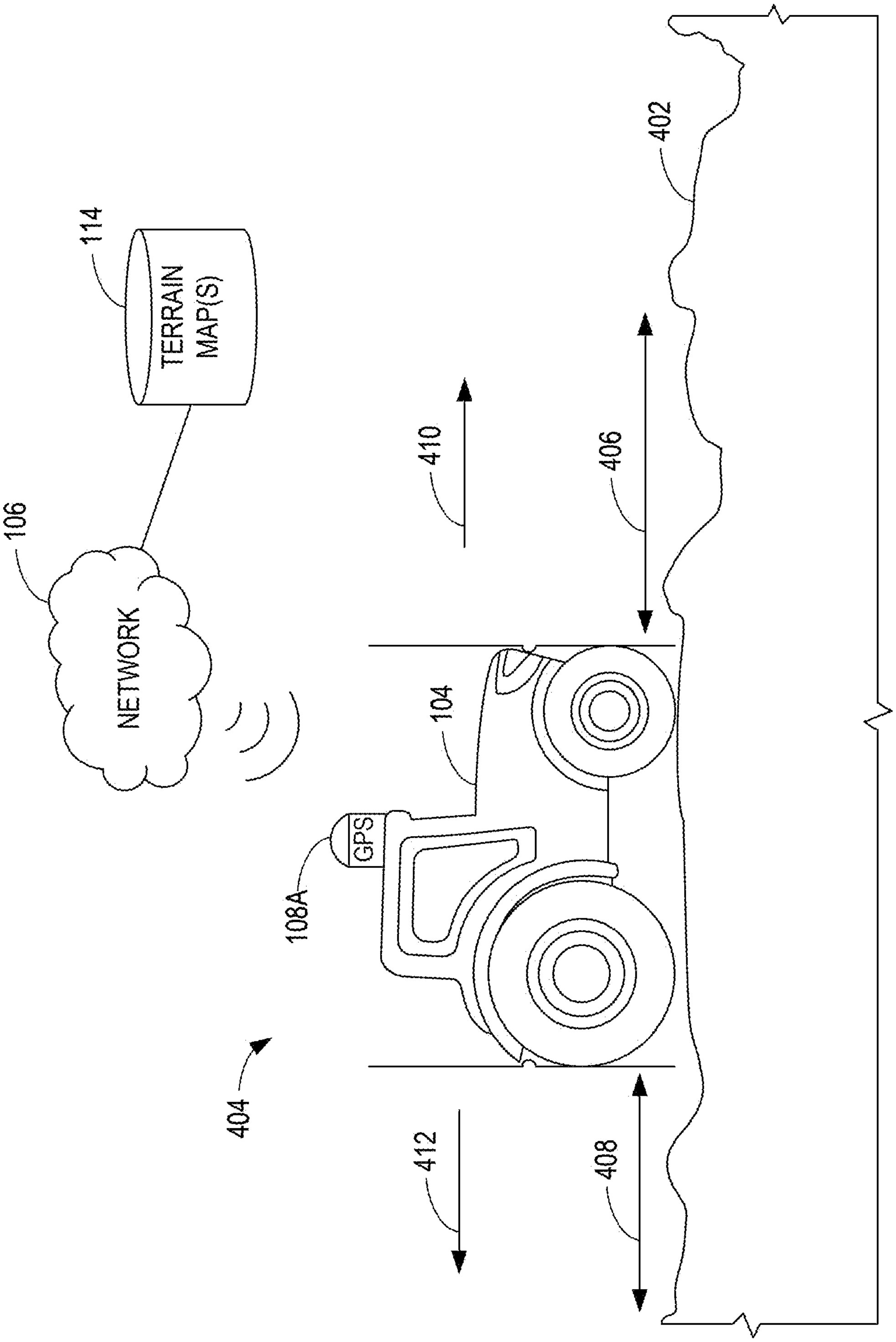
FIG. 4 illustrates the example vehicle of FIG. 1 travelling and/or operating on an example field.

FIG. 4 illustrates the example vehicle 104 of FIG. 1 travelling and/or operating on an example field 402. In the illustrated example of FIG. 4, the vehicle 104 (e.g., via the speed control circuitry 102 of FIGS. 1 and/or 2) accesses one or more of the terrain map(s) 114 via the network 106, where the one(s) of the terrain map(s) 114 correspond to the field 402. In some examples, the terrain map 114 includes altitude(s) measured and/or determined for respective locations (e.g., latitude-longitude coordinates, regions, etc.) of the field 402. Further, the speed control circuitry 102 accesses location data (e.g., GPS data) associated with the vehicle 104 from the GPS sensor 108A.

In the illustrated example of FIG. 4, the speed control circuitry 102 determines example terrain information based on the terrain map 114 of the field 402 and the location data associated with the vehicle 104. For example, the speed control circuitry 102 can determine, based on the location data, a current location 404 of the vehicle 104 in the field 402. Further, the speed control circuitry 102 selects and/or identifies, based on the current location 404, a first area 406 of the field 402 that is forward relative to the vehicle 104 (e.g., in a projected path of the vehicle 104), and/or a second area 408 of the field 402 that is rearward relative to the vehicle 104. In some examples, the speed control circuitry 102 identifies the first area 406 and/or the second area 408 based on one or more distances and/or based on a width (e.g., an operational width) of the vehicle 104. For example, the speed control circuitry 102 can identify the first area 406 corresponding to a first example distance (e.g., 10 feet (ft), 15 ft, etc.) forward (e.g., in a forward direction 410) from the current location of vehicle 104 and corresponding to at least the width of the vehicle 104. Additionally or alternatively, the speed control circuitry 102 can identify the second area 408 corresponding to a second example distance (e.g., 10 ft, 15 ft, etc.) rearward (e.g., in a rearward direction 412) from the current location 404 of the vehicle 104 and corresponding to at least the width of the vehicle 104. In some examples, the first distance and/or the second distance can be preloaded in the speed control circuitry 102, and/or can be user-selected (e.g., based on the user input 222). In some examples, the speed control circuitry 102 can select and/or identify one or more areas of the field 402 to the side of the vehicle 104 (e.g., into and/or out of the page in FIG. 4), and/or can select an area (e.g., a circular area) around the vehicle 104 (e.g., corresponding to an example radius (e.g., 10 ft, 20 ft, etc.) from the current location 404 of the vehicle 104).

In some examples, the speed control circuitry 102 determines and/or generates example terrain information corresponding to the selected area(s) (e.g., the first area 406 and/or the second area 408). For example, the speed control circuitry 102 obtains, from the terrain map 114 of the field 402, the altitude(s) corresponding to the selected area(s), and generates the terrain information based on the altitude(s). In some examples, the terrain information can include different information (e.g., slope(s), crop location(s), soil type(s), moisture level(s), etc.) associated with the selected area(s) of the field 402 (e.g., in addition to or instead of the altitude(s)). In some examples, the speed control circuitry 102 provides the terrain information as input to the speed prediction model(s) for use in determining the target speed(s) for the vehicle 104. For example, as shown in FIG. 4, the terrain of the field 402 in a projected path of the vehicle 104 (e.g., in the first area 406 of the field 402) is relatively uneven and/or rugged. Such rugged terrain may result in oscillation of the vehicle 104 when the vehicle 104 travels along the field 402, and such oscillation can damage one or more components of the vehicle 104 and/or can result in an uncomfortable ride experience for an operator of the vehicle 104. As such, when the terrain information is utilized as input to the speed prediction model(s), the target speed(s) may be reduced (e.g., relative to a current travel speed of the vehicle 104) to reduce likelihood of damage to the vehicle 104 and/or to increase comfort for the operator.

In some examples, the speed control circuitry 102 includes means for obtaining data. For example, the means for obtaining data may be implemented by the data interface circuitry 202. In some examples, the data interface circuitry 202 may be instantiated by programmable circuitry such as the example programmable circuitry 712 of FIG. 7. For instance, the data interface circuitry 202 may be instantiated by the example microprocessor 800 of FIG. 8 executing machine executable instructions such as those implemented by at least blocks 502, 518 of FIG. 5. In some examples, the data interface circuitry 202 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the data interface circuitry 202 may be instantiated by any other combination of hardware, software, and/or firmware. For example, the data interface circuitry 202 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for monitoring. For example, the means for monitoring may be implemented by the parameter monitoring circuitry 204. In some examples, the parameter monitoring circuitry 204 may be instantiated by programmable circuitry such as the example programmable circuitry 712 of FIG. 7. For instance, the parameter monitoring circuitry 204 may be instantiated by the example microprocessor 800 of FIG. 8 executing machine executable instructions such as those implemented by at least blocks 506, 508 of FIG. 5. In some examples, the parameter monitoring circuitry 204 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the parameter monitoring circuitry 204 may be instantiated by any other combination of hardware, software, and/or firmware. For example, the parameter monitoring circuitry 204 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for analyzing terrain. For example, the means for analyzing terrain may be implemented by the terrain analysis circuitry 206. In some examples, the terrain analysis circuitry 206 may be instantiated by programmable circuitry such as the example programmable circuitry 712 of FIG. 7. For instance, the terrain analysis circuitry 206 may be instantiated by the example microprocessor 800 of FIG. 8 executing machine executable instructions such as those implemented by at least block 504 of FIG. 5. In some examples, the terrain analysis circuitry 206 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the terrain analysis circuitry 206 may be instantiated by any other combination of hardware, software, and/or firmware. For example, the terrain analysis circuitry 206 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for training. For example, the means for training may be implemented by the model training circuitry 208. In some examples, the model training circuitry 208 may be instantiated by programmable circuitry such as the example programmable circuitry 712 of FIG. 7. For instance, the model training circuitry 208 may be instantiated by the example microprocessor 800 of FIG. 8 executing machine executable instructions such as those implemented by at least blocks 602, 604, 606, 608, 610, 612, 614, 616 of FIG. 6. In some examples, the model training circuitry 208 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the model training circuitry 208 may be instantiated by any other combination of hardware, software, and/or firmware. For example, the model training circuitry 208 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for controlling a user interface. For example, the means for controlling a user interface may be implemented by the user interface circuitry 210. In some examples, the user interface circuitry 210 may be instantiated by programmable circuitry such as the example programmable circuitry 712 of FIG. 7. For instance, the user interface circuitry 210 may be instantiated by the example microprocessor 800 of FIG. 8 executing machine executable instructions such as those implemented by at least block 514 of FIG. 5. In some examples, the user interface circuitry 210 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the user interface circuitry 210 may be instantiated by any other combination of hardware, software, and/or firmware. For example, the user interface circuitry 210 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for executing. For example, the means for executing may be implemented by the model execution circuitry 212. In some examples, the model execution circuitry 212 may be instantiated by programmable circuitry such as the example programmable circuitry 712 of FIG. 7. For instance, the model execution circuitry 212 may be instantiated by the example microprocessor 800 of FIG. 8 executing machine executable instructions such as those implemented by at least blocks 510, 512 of FIG. 5. In some examples, the model execution circuitry 212 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the model execution circuitry 212 may be instantiated by any other combination of hardware, software, and/or firmware. For example, the model execution circuitry 212 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the speed control circuitry 102 includes means for controlling a vehicle. For example, the means for controlling a vehicle may be implemented by the vehicle control circuitry 214. In some examples, the vehicle control circuitry 214 may be instantiated by programmable circuitry such as the example programmable circuitry 712 of FIG. 7. For instance, the vehicle control circuitry 214 may be instantiated by the example microprocessor 800 of FIG. 8 executing machine executable instructions such as those implemented by at least block 516 of FIG. 5. In some examples, the vehicle control circuitry 214 may be instantiated by hardware logic circuitry, which may be implemented by an ASIC, XPU, GPU, or the FPGA circuitry 900 of FIG. 9 configured and/or structured to perform operations corresponding to the machine-readable instructions. Additionally or alternatively, the vehicle control circuitry 214 may be instantiated by any other combination of hardware, software, and/or firmware. For example, the vehicle control circuitry 214 may be implemented by at least one or more hardware circuits (e.g., processor circuitry, discrete and/or integrated analog and/or digital circuitry, an FPGA, an ASIC, an XPU, a GPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the speed control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example data interface circuitry 202, the example parameter monitoring circuitry 204, the example terrain analysis circuitry 206, the example model training circuitry 208, the example user interface circuitry 210, the example model execution circuitry 212, the example vehicle control circuitry 214, the example database 216, and/or, more generally, the example speed control circuitry 102 of FIG. 2, may be implemented by hardware alone or by hardware in combination with software and/or firmware. Thus, for example, any of the example data interface circuitry 202, the example parameter monitoring circuitry 204, the example terrain analysis circuitry 206, the example model training circuitry 208, the example user interface circuitry 210, the example model execution circuitry 212, the example vehicle control circuitry 214, the example database 216, and/or, more generally, the example speed control circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example speed control circuitry 102 of FIG. 2 may include one or more elements, processes, and/or devices in addition to, or instead of, those illustrated in FIG. 2, and/or may include more than one of any or all of the illustrated elements, processes and devices.

Figure 5:
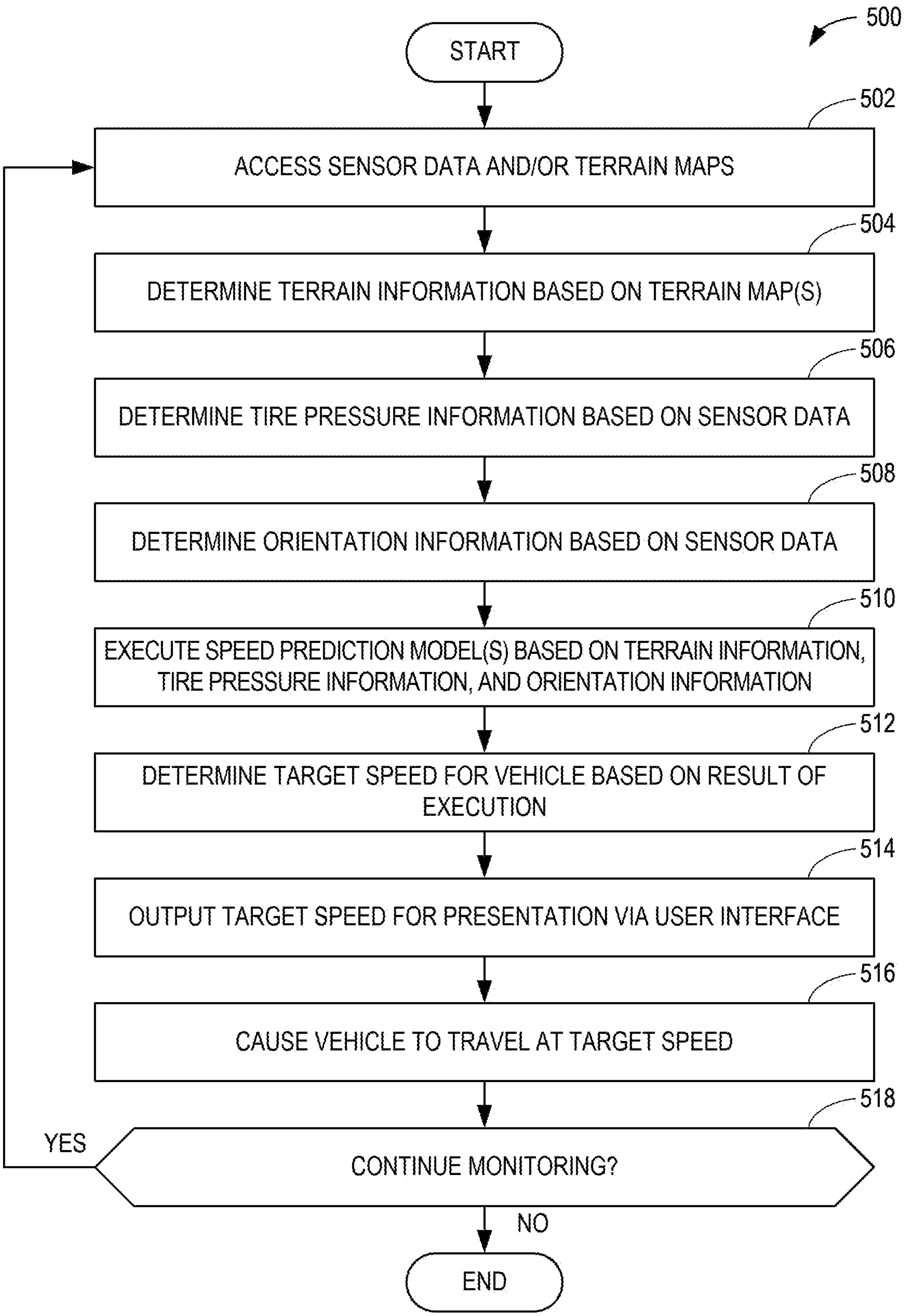
FIG. 5 is a flowchart representative of example machine readable instructions and/or example operations that may be executed, instantiated, and/or performed by example programmable circuitry to implement the speed control circuitry 102 of FIG. 2.

Flowchart(s) representative of example machine readable instructions, which may be executed by programmable circuitry to implement and/or instantiate the speed control circuitry 102 of FIG. 2 and/or representative of example operations which may be performed by programmable circuitry to implement and/or instantiate the speed control circuitry 102 of FIG. 2, are shown in FIGS. 5 and/or 6. The machine readable instructions may be one or more executable programs or portion(s) of one or more executable programs for execution by programmable circuitry such as the programmable circuitry 712 shown in the example processor platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 5 and/or 6, many other methods of implementing the example speed control circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a GPU, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU, a GPU, and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine readable instructions and/or the corresponding program(s) can be executed in whole or in part. Thus, machine readable, computer readable and/or machine-readable media, as used herein, may include instructions and/or program(s) regardless of the particular format or state of the machine readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and/or 6 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to determine a target speed for the vehicle 104 of FIG. 1. The example machine-readable instructions and/or the example operations 500 of FIG. 5 begin at block 502, at which the example speed control circuitry 102 of FIGS. 1 and/or 2 accesses the example sensor data 220 of FIG. 2 and/or the example terrain map(s) 114 of FIGS. 1 and/or 2. For example, the data interface circuitry 202 of FIG. 2 accesses (e.g., from one or more of the vehicle sensors 108 of FIG. 1) the sensor data 220 for a corresponding (e.g., current) location of the vehicle 104. Further, the data interface circuitry 202 accesses (e.g., via the network 106 of FIG. 1) one(s) of the terrain map(s) 114 corresponding to a field on which the vehicle 104 is to perform an operation.

At block 504, the speed control circuitry 102 determines example terrain information based on the terrain map(s) 114. For example, the terrain analysis circuitry 206 of FIG. 2 determines a current location of the vehicle 104 in the field based on a portion of the sensor data 220 from the GPS sensor 108A of FIG. 1. Further, the terrain analysis circuitry 206 determines, based on the terrain map(s) 114, the terrain information associated with the current location. In some examples, the terrain analysis circuitry 206 can determine the terrain information corresponding to a region surrounding and/or proximate to the current location, and/or can determine the terrain information corresponding to a projected path of the vehicle 104. In some examples, the terrain information includes altitudes of the ground at respective locations (e.g., latitude-longitude coordinates) within the region and/or the projected path.

At block 506, the speed control circuitry 102 determines example tire pressure information associated with the vehicle 104. For example, the parameter monitoring circuitry 204 of FIG. 2 determines the tire pressure information corresponding to the current location of the vehicle 104 based on a portion of the sensor data 220 from the tire pressure sensor(s) 108C of FIG. 1. In some examples, the tire pressure information includes measured tire pressures at respective wheels 112 of the vehicle 104.

At block 508, the speed control circuitry 102 determines example orientation information associated with the vehicle 104. For example, the parameter monitoring circuitry 204 of FIG. 2 determines the orientation information corresponding to the current location of the vehicle 104 based on a portion of the sensor data 220 from the IMU sensor 108B of FIG. 1. In some examples, the orientation information includes a yaw angle, a pitch angle, a roll angle, a yaw angle rate, a pitch angle rate, and/or a roll angle rate of the vehicle 104 with respect to the ground and/or to a starting position of the vehicle 104.

At block 510, the speed control circuitry 102 executes example speed prediction model(s) based on the terrain information, the tire pressure information, and the orientation information. For example, the model execution circuitry 212 executes provides the terrain information, the tire pressure information, and the orientation information as input to the speed prediction model(s), and executes the speed prediction model(s) based on the input.

At block 512, the speed control circuitry 102 determines a target speed for the vehicle 104 based on a result of the execution. For example, as a result of execution of the speed prediction model(s), the model execution circuitry 212 determines the target speed corresponding to a particular location, region, and/or path of the vehicle 104 in the field. In some examples, the target speed is a speed at which the vehicle 104 can travel to provide a relatively smooth and/or comfortable ride experience to the operator, reduce likelihood of damage to the vehicle 104, etc.

At block 514, the speed control circuitry 102 outputs the target speed for presentation via the user interface 110 of FIG. 1. For example, the example user interface circuitry 210 of FIG. 2 generates the example display information 224 including the target speed, and causes the user interface 110 to output the display information 224 for presentation by the user interface 110 to the operator of the vehicle 104. Additionally or alternatively, the user interface circuitry 210 can cause the display information 224 to be output by one or more different devices (e.g., a remote device, a computer device, etc.) communicatively coupled to the speed control circuitry 102 (e.g., via the network 106 of FIG. 1).

At block 516, the speed control circuitry 102 causes the vehicle 104 to travel at or near (e.g., within ±10% of) the target speed. For example, the vehicle control circuitry 214 of FIG. 2 adjusts (e.g., increases and/or decreases), via a propulsion system of the vehicle 104, a speed of the vehicle 104 to match (e.g., be substantially equal to, be within ±10% of) the target speed. In some examples, block 516 may be omitted, and the operator can manually adjust the speed of the vehicle 104 (e.g., by engaging a brake pedal and/or a gas pedal of the vehicle 104) to cause the vehicle 104 to travel at or near the target speed.

At block 518, the speed control circuitry 102 determines whether to continue monitoring. For example, the data interface circuitry 202 determines to continue monitoring for the sensor data 220 when the vehicle 104 is operating and/or travelling in a field. In response to the data interface circuitry 202 determining to continue monitoring (e.g., block 518 returns a result of YES), control returns to block 502. Alternatively, in response to the data interface circuitry 202 determining not to continue monitoring (e.g., block 518 returns a result of NO), control ends.

Figure 6:
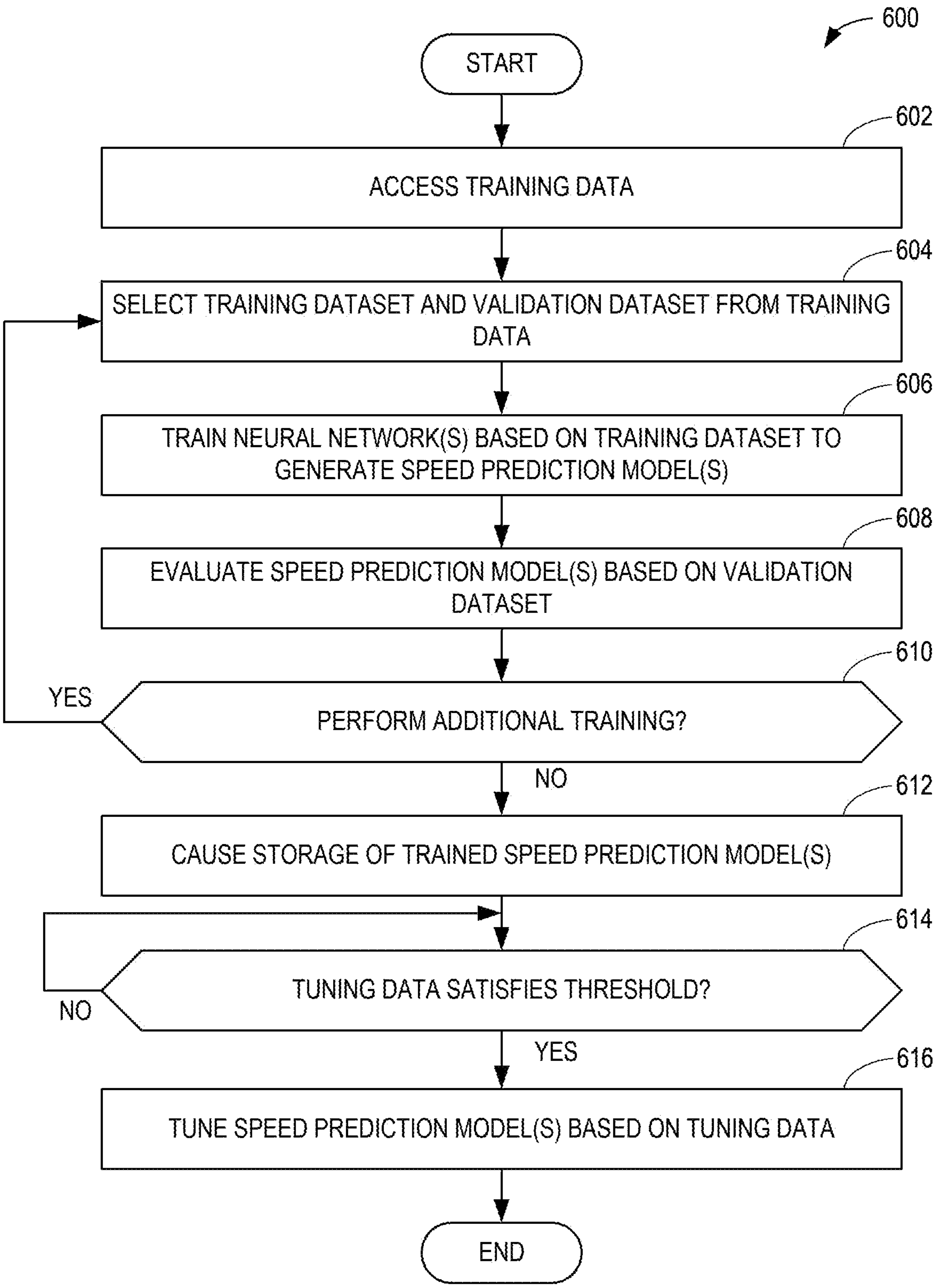
FIG. 6 is a flowchart representative of example machine readable instructions and/or example operations that may be executed, instantiated, and/or performed by example programmable circuitry to generate and/or train example speed prediction model(s).

FIG. 6 is a flowchart representative of example machine readable instructions and/or example operations 600 that may be executed, instantiated, and/or performed by programmable circuitry to generate and/or train one or more example speed prediction models. The example machine-readable instructions and/or the example operations 600 of FIG. 6 begin at block 602, at which the example speed control circuitry 102 of FIGS. 1 and/or 2 accesses the example training data 116 of FIG. 1. For example, the model training circuitry 208 of FIG. 2 can access the training data 116 obtained via the network 106 of FIG. 1 and/or stored in the database 216 of FIG. 2.

At block 604, the speed control circuitry 102 selects a training dataset and a validation dataset from the training data 116. For example, the model training circuitry 208 selects a first portion (e.g., 80%) of the training data 116 as the training dataset and selects a second portion (e.g., 20%) of the training data 116 as the validation dataset.

At block 606, the speed control circuitry 102 trains one or more neural networks based on the training dataset to generate the speed prediction model(s). For example, the model training circuitry 208 identifies patterns between features (e.g., terrain information, tire pressures, orientations, vibration levels, etc.) and corresponding target speed(s) represented in the training dataset, and adjusts weight(s) of the neural network(s) based on the identified patterns. In some examples, the model training circuitry 208 generates the speed prediction model(s) based on the trained neural network(s).

At block 608, the speed control circuitry 102 evaluates the speed prediction model(s) based on the validation dataset. For example, the model training circuitry 208 executes the speed prediction model(s) based on features (e.g., validation features) represented in the validation dataset to output predicted target speed(s), then compares the predicted target speed(s) to the corresponding target speed(s) (e.g., ground truth target speeds) represented in the validation dataset. In some examples, the model training circuitry 208 determines difference(s) (e.g., percentage difference(s)) between the predicted target speed(s) and the ground truth target speed(s), and evaluates the difference(s) based on one or more thresholds (e.g., performance threshold(s)).

At block 610, the speed control circuitry 102 determines whether to perform additional training. For example, the model training circuitry 208 determines that additional training is to be performed when the difference(s) (e.g., between the predicted target speed(s) and the ground truth target speed(s)) do not satisfy the performance threshold(s), and determines that no additional training is necessary when the difference(s) satisfy the performance threshold(s). In response to the model training circuitry 208 determining that additional training is to be performed (e.g., block 610 returns a result of YES), control returns to block 604. Alternatively, in response to the model training circuitry 208 determining that no additional training is to be performed (e.g., block 610 returns a result of NO), control proceeds to block 612.

At block 612, the speed control circuitry 102 causes storage of the trained speed prediction model(s). For example, the model training circuitry 208 provides the trained speed prediction model(s) to the database 216 of FIG. 2 for storage in the database 216. In some examples, the stored speed prediction model(s) are accessible to and/or executable by the model execution circuitry 212 of FIG. 2.

At block 614, the speed control circuitry 102 determines whether tuning data collected by the speed control circuitry 102 satisfies a threshold (e.g., a tuning threshold) indicative of whether a sufficient amount of the tuning data has been collected. For example, the model training circuitry 208 determines that a sufficient amount of the tuning data has been collected when the target speed(s) have been overridden (e.g., the operator has manually controlled the speed of the vehicle 104) at least a threshold number of times and/or for at least a threshold duration. In response to the speed control circuitry 102 determining that the tuning data does not satisfy the threshold(s) (e.g., block 614 returns a result of NO), the process remains at block 614 and the speed control circuitry 102 continues monitoring the tuning data. Alternatively, in response to the speed control circuitry 102 determining that the tuning data satisfies the threshold(s) (e.g., block 614 returns a result of YES), control proceeds to block 616.

At block 616, the speed control circuitry 102 tunes the speed prediction model(s) based on the tuning data. For example, the model training circuitry 208 can identify patterns and/or correlations between features (e.g., the orientation information, the terrain information, and/or the tire pressure information) represented in the tuning data with the corresponding speed(s) represented in the tuning data, then adjust (e.g., tune) one or more parameters (e.g., hyperparameter(s), weight(s), etc.) of the speed prediction model(s) based on the identified patterns and/or correlations. In some examples, the model training circuitry 208 updates and/or replaces stored one(s) of the speed prediction model(s) in the database 216 with the tuned speed prediction model(s).

Figure 7:
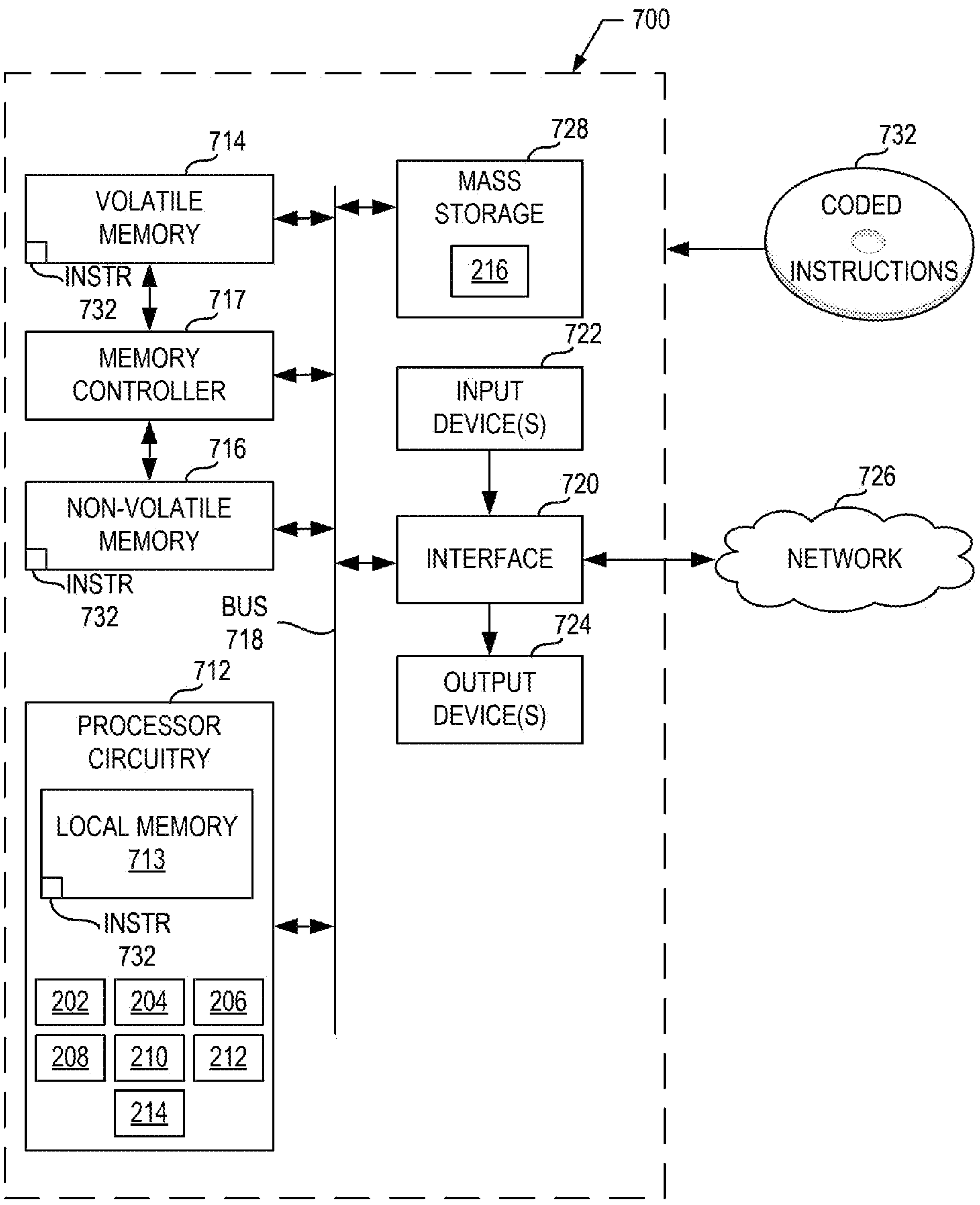
FIG. 7 is a block diagram of an example processing platform including programmable circuitry structured to execute, instantiate, and/or perform the example machine readable instructions and/or perform the example operations of FIGS. 5 and/or 6 to implement the speed control circuitry 102 of FIG. 2.

FIG. 7 is a block diagram of an example programmable circuitry platform 700 structured to execute and/or instantiate the example machine-readable instructions and/or the example operations of FIGS. 5 and/or 6 to implement the speed control circuitry 102 of FIG. 2. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the data interface circuitry 202, the parameter monitoring circuitry 204, the terrain analysis circuitry 206, the model training circuitry 208, the user interface circuitry 210, the model execution circuitry 212, the vehicle control circuitry 214, and the database 216.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 5 and/or 6, may be stored in the mass storage device 728, in the volatile memory 714, in the non-volatile memory 716, and/or on at least one non-transitory computer readable storage medium such as a CD or DVD which may be removable.

Figure 8:
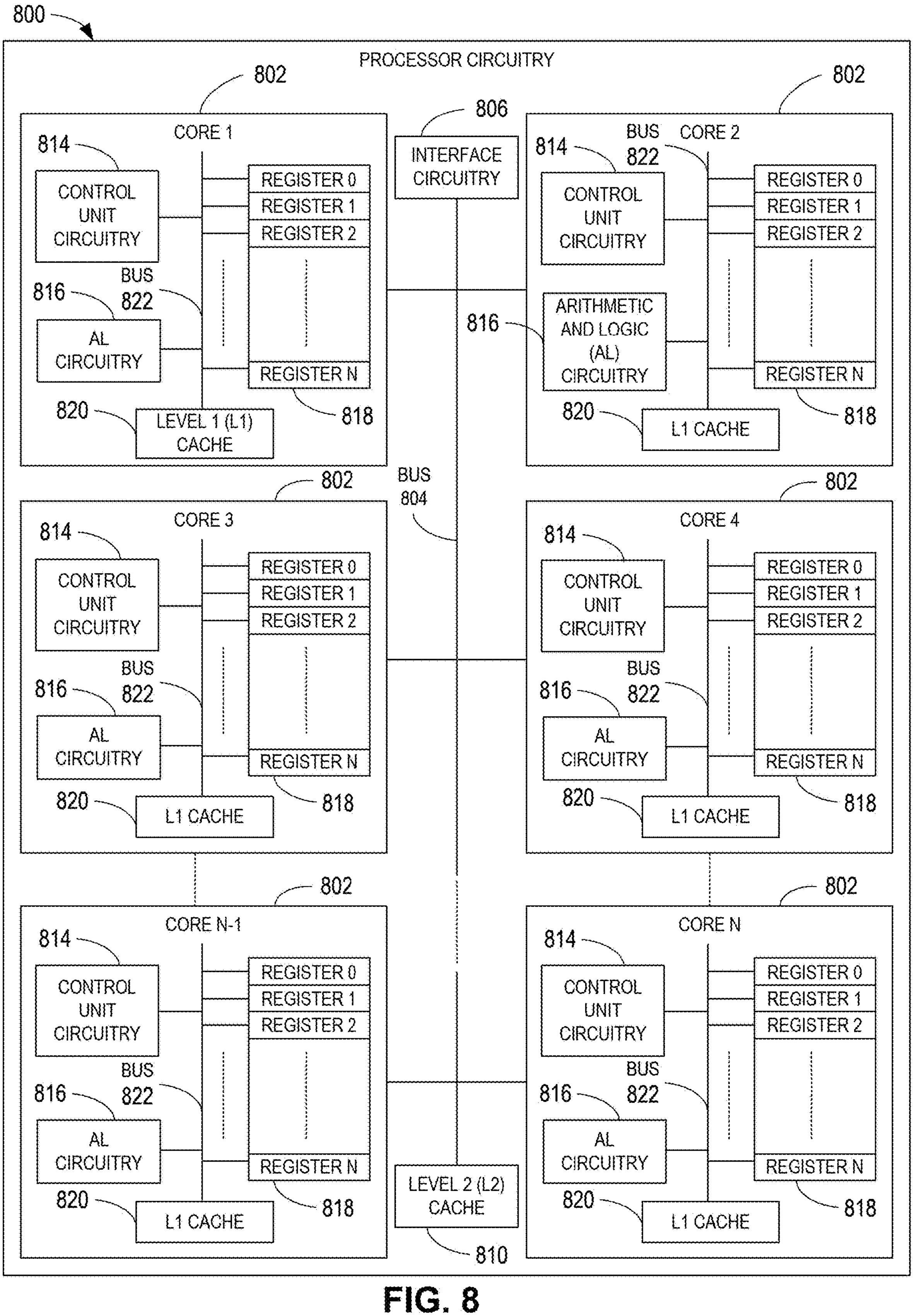
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 5 and/or 6 to effectively instantiate the circuitry of FIG. 2 as logic circuits to perform operations corresponding to those machine-readable instructions. In some such examples, the circuitry of FIG. 2 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine-readable instructions and/or operations represented by the flowcharts of FIGS. 5 and/or 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
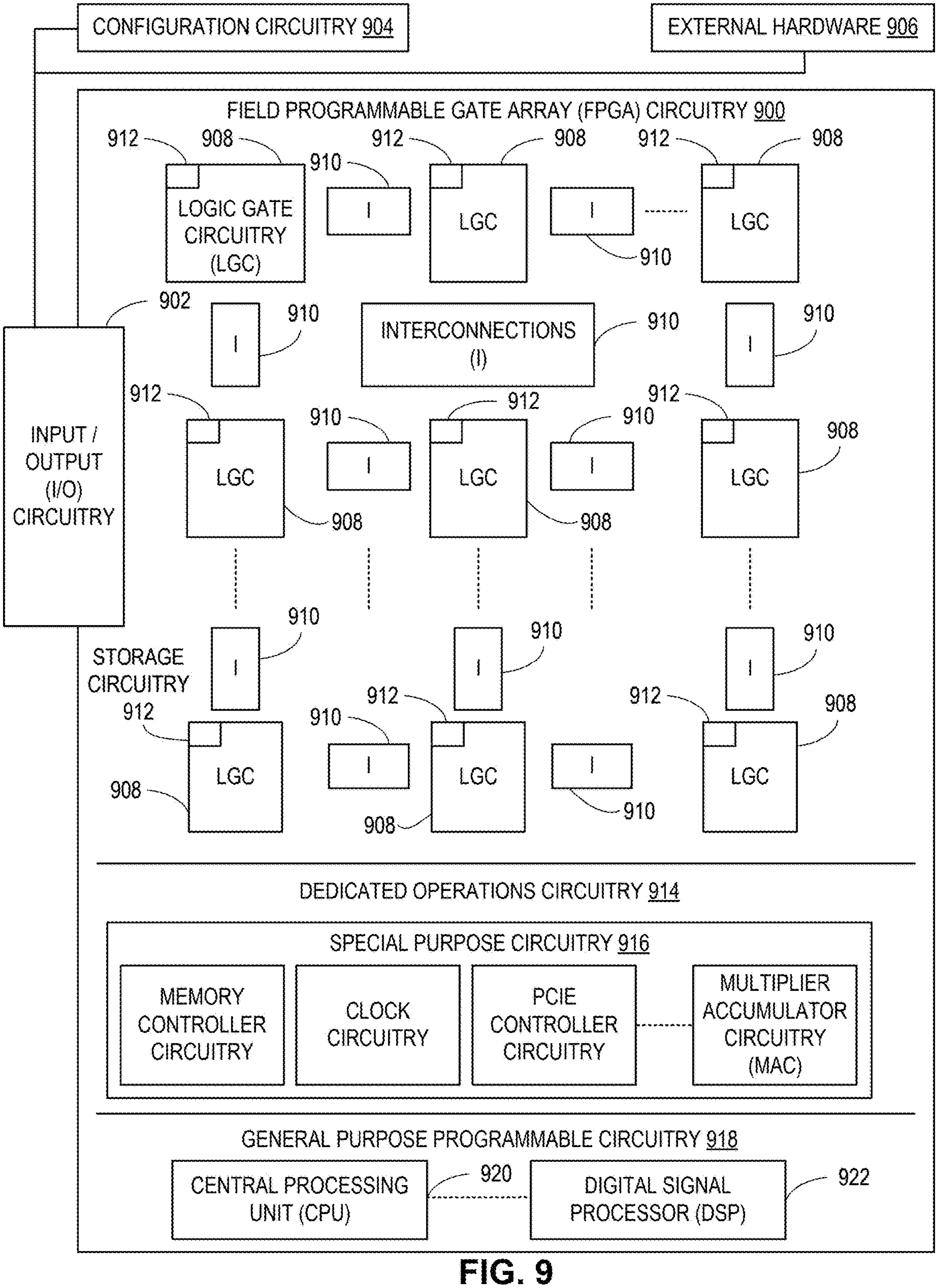
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine-readable instructions. However, once configured, the FPGA circuitry 900 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 5 and/or 6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 5 and/or 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 5 and/or 6. As such, the FPGA circuitry 900 may be configured and/or structured to effectively instantiate some or all of the operations/functions corresponding to the machine readable instructions of the flowchart(s) of FIGS. 5 and/or 6 as dedicated logic circuits to perform the operations/functions corresponding to those software instructions in a dedicated manner analogous to an ASIC. Therefore, the FPGA circuitry 900 may perform the operations/functions corresponding to the some or all of the machine-readable instructions of FIGS. 5 and/or 6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine-readable instructions of FIGS. 5 and/or 6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 5 and/or 6 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 5 and/or 6, and/or an ASIC may be configured and/or structured to perform third operation(s)/function(s) corresponding to a third portion of the machine readable instructions represented by the flowcharts of FIGS. 5 and/or 6.

It should be understood that some or all of the circuitry of FIG. 2 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 2 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
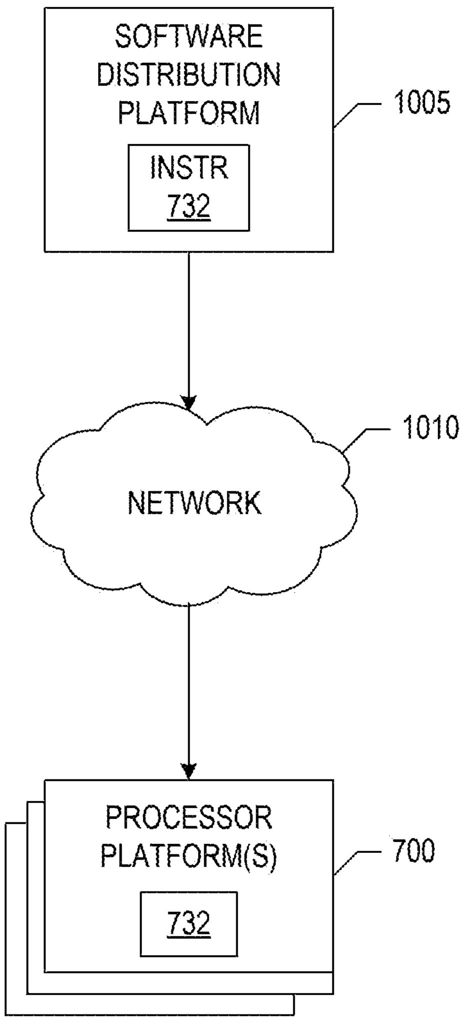
FIG. 10 is a block diagram of an example software/firmware/instructions distribution platform (e.g., one or more servers) to distribute software, instructions, and/or firmware (e.g., corresponding to the example machine readable instructions of FIGS. 5 and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine-readable instructions 732, which may correspond to the example machine readable instructions of FIGS. 5 and/or 6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 732 from the software distribution platform 1005. For example, the software, which may correspond to the example machine readable instructions of FIGS. 5 and/or 6, may be downloaded to the example programmable circuitry platform 700, which is to execute the machine-readable instructions 732 to implement the speed control circuitry 102. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been described that determine a target speed for a vehicle operating and/or travelling in a field. Example speed control circuitry described herein accesses and/or obtains sensor data associated with the vehicle, where the sensor data can include orientation information (e.g., yaw angle(s), pitch angle(s), roll angle(s), etc.) and/or tire pressure information corresponding to respective wheel(s) of the vehicle. Further, the speed control circuitry can access one or more example terrain maps corresponding to the field, where the terrain map(s) can include terrain information such as altitude(s), slope(s), crop location(s), soil type(s), moisture level(s), etc. corresponding to location(s) in the field. The speed control circuitry can execute one or more speed prediction model(s) (e.g., generated and/or trained using neural network(s)) based on the orientation information, the tire pressure information, and/or the terrain information to output target speed(s) for the vehicle. In some examples, the speed control circuitry can output the target speed(s) for presentation (e.g., to an operator of the vehicle) and/or can automatically (e.g., via a propulsion system of the vehicle) cause the vehicle to travel at or near (e.g., within ±10% of) the target speed(s). As a result, described examples can reduce operator fatigue, reduce likelihood of damage to the vehicle, and/or provide a smooth and/or comfortable ride experience for the operator. Described systems, apparatus, articles of manufacture, and methods are accordingly directed to one or more improvement(s) in the operation of a machine or other electronic and/or mechanical device.

Example methods, apparatus, systems, and articles of manufacture to determine a target speed for an agricultural vehicle are described herein. Further examples and combinations thereof include the following:

Example 1 includes an apparatus comprising interface circuitry, machine-readable instructions, and at least one processor circuit to be programmed by the machine-readable instructions to obtain a terrain map corresponding to a field, obtain, from one or more sensors of a vehicle, orientation information and tire pressure information corresponding to the vehicle, execute a predictive model based on (a) the terrain map, (b) the orientation information, and (c) the tire pressure information, and determine, based on a result of the execution, a target speed for the vehicle on the field.

Example 2 includes the apparatus of example 1, wherein one or more of the at least one processor circuit is to cause the vehicle to traverse the field at the target speed.

Example 3 includes the apparatus of example 1, wherein one or more of the at least one processor circuit is to execute the predictive model based on a threshold speed obtained based on user input.

Example 4 includes the apparatus of example 1, wherein the terrain map includes altitude information corresponding to respective locations of the field.

Example 5 includes the apparatus of example 1, wherein one or more of the at least one processor circuit is to output the target speed for presentation by a user interface of the vehicle.

Example 6 includes the apparatus of example 1, wherein one or more of the at least one processor circuit is to train the predictive model based on at least one of (a) simulation results corresponding to the vehicle or (b) historical speed information corresponding to the field.

Example 7 includes the apparatus of example 1, wherein one or more of the at least one processor circuit is to execute the predictive model based on vibration information from the one or more sensors.

Example 8 includes the apparatus of example 1, wherein the orientation information includes at least one of a pitch angle or a roll angle of the vehicle with respect to the ground at respective locations of the field.

Example 9 includes At least one non-transitory machine-readable medium comprising machine-readable instructions to cause at least one processor circuit to at least obtain a terrain map corresponding to a field, obtain, from one or more sensors of a vehicle, orientation information and tire pressure information corresponding to the vehicle, execute a predictive model based on (a) the terrain map, (b) the orientation information, and (c) the tire pressure information, and determine, based on a result of the execution, a target speed for the vehicle on the field.

Example 10 includes the at least one non-transitory machine-readable medium of example 9, wherein the machine-readable instructions are to cause one or more of the at least one processor circuit to cause the vehicle to traverse the field at the target speed.

Example 11 includes the at least one non-transitory machine-readable medium of example 9, wherein the machine-readable instructions are to cause one or more of the at least one processor circuit to execute the predictive model based on a threshold speed obtained based on user input.

Example 12 includes the at least one non-transitory machine-readable medium of example 9, wherein the terrain map includes altitude information corresponding to respective locations of the field.

Example 13 includes the at least one non-transitory machine-readable medium of example 9, wherein the machine-readable instructions are to cause one or more of the at least one processor circuit to output the target speed for presentation by a user interface of the vehicle.

Example 14 includes the at least one non-transitory machine-readable medium of example 9, wherein the machine-readable instructions are to cause one or more of the at least one processor circuit to train the predictive model based on at least one of (a) simulation results corresponding to the vehicle or (b) historical speed information corresponding to the field.

Example 15 includes the at least one non-transitory machine-readable medium of example 9, wherein the machine-readable instructions are to cause one or more of the at least one processor circuit to execute the predictive model based on vibration information from the one or more sensors.

Example 16 includes the at least one non-transitory machine-readable medium of example 9, wherein the orientation information includes at least one of a pitch angle or a roll angle of the vehicle with respect to the ground at respective locations of the field.

Example 17 includes a method comprising obtaining a terrain map corresponding to a field, obtaining, from one or more sensors of a vehicle, orientation information and tire pressure information corresponding to the vehicle, executing a predictive model based on (a) the terrain map, (b) the orientation information, and (c) the tire pressure information, and determining, based on a result of the execution, a target speed for the vehicle on the field.

Example 18 includes the method of example 17, further including causing the vehicle to traverse the field at the target speed.

Example 19 includes the method of example 17, wherein the terrain map includes altitude information corresponding to respective locations of the field.

Example 20 includes the method of example 17, further including executing the predictive model based on vibration information from the one or more sensors.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

interface circuitry;

machine-readable instructions; and at least one processor circuit to be programmed by the machine-readable instructions to:

obtain a terrain map corresponding to a field;

obtain, from one or more sensors of a vehicle, orientation information and tire pressure information corresponding to the vehicle;

execute a predictive model based on (a) the terrain map, (b) the orientation information, and (c) the tire pressure information;

determine, based on a result of the execution, a target speed for the vehicle on the field;

obtain tuning data in response to a manual override of the target speed; and when the tuning data satisfies a threshold, tune the predictive model for the vehicle based on the tuning data.

2. The apparatus of claim 1, wherein one or more of the at least one processor circuit is to cause the vehicle to traverse the field at the target speed.

3. The apparatus of claim 1, wherein one or more of the at least one processor circuit is to execute the predictive model based on a threshold speed obtained based on user input.

4. The apparatus of claim 1, wherein the terrain map includes altitude information corresponding to respective locations of the field.

5. The apparatus of claim 1, wherein one or more of the at least one processor circuit is to output the target speed for presentation by a user interface of the vehicle.

6. The apparatus of claim 1, wherein one or more of the at least one processor circuit is to train the predictive model based on at least one of (a) simulation results corresponding to the vehicle or (b) historical speed information corresponding to the field.

7. The apparatus of claim 1, wherein one or more of the at least one processor circuit is to execute the predictive model based on vibration information from the one or more sensors.

8. The apparatus of claim 1, wherein the orientation information includes at least one of a pitch angle or a roll angle of the vehicle with respect to ground at respective locations of the field.

9. At least one non-transitory machine-readable medium comprising machine-readable instructions to cause at least one processor circuit to at least:

obtain a terrain map corresponding to a field;

obtain, from one or more sensors of a vehicle, orientation information and tire pressure information corresponding to the vehicle;

execute a predictive model based on (a) the terrain map, (b) the orientation information, and (c) the tire pressure information;

determine, based on a result of the execution, a target speed for the vehicle on the field;

obtain tuning data in response to a manual override of the target speed; and when the tuning data satisfies a threshold, tune the predictive model for the vehicle based on the tuning data.

10. The at least one non-transitory machine-readable medium of claim 9, wherein the machine-readable instructions are to cause one or more of the at least one processor circuit to cause the vehicle to traverse the field at the target speed.

11. The at least one non-transitory machine-readable medium of claim 9, wherein the machine-readable instructions are to cause one or more of the at least one processor circuit to execute the predictive model based on a threshold speed obtained based on user input.

12. The at least one non-transitory machine-readable medium of claim 9, wherein the terrain map includes altitude information corresponding to respective locations of the field.

13. The at least one non-transitory machine-readable medium of claim 9, wherein the machine-readable instructions are to cause one or more of the at least one processor circuit to output the target speed for presentation by a user interface of the vehicle.

14. The at least one non-transitory machine-readable medium of claim 9, wherein the machine-readable instructions are to cause one or more of the at least one processor circuit to train the predictive model based on at least one of (a) simulation results corresponding to the vehicle or (b) historical speed information corresponding to the field.

15. The at least one non-transitory machine-readable medium of claim 9, wherein the machine-readable instructions are to cause one or more of the at least one processor circuit to execute the predictive model based on vibration information from the one or more sensors.

16. The at least one non-transitory machine-readable medium of claim 9, wherein the orientation information includes at least one of a pitch angle or a roll angle of the vehicle with respect to ground at respective locations of the field.

17. A method comprising:

obtaining a terrain map corresponding to a field;

obtaining, from one or more sensors of a vehicle, orientation information and tire pressure information corresponding to the vehicle;

executing a predictive model based on (a) the terrain map, (b) the orientation information, and (c) the tire pressure information;

determining, based on a result of the execution, a target speed for the vehicle on the field;

obtaining tuning data in response to a manual override of the target speed; and when the tuning data satisfies a threshold, tuning the predictive model for the vehicle based on the tuning data.

18. The method of claim 17, further including causing the vehicle to traverse the field at the target speed.

19. The method of claim 17, wherein the terrain map includes altitude information corresponding to respective locations of the field.

20. The method of claim 17, further including executing the predictive model based on vibration information from the one or more sensors.

* * * * *